Patented July 29, 1924.

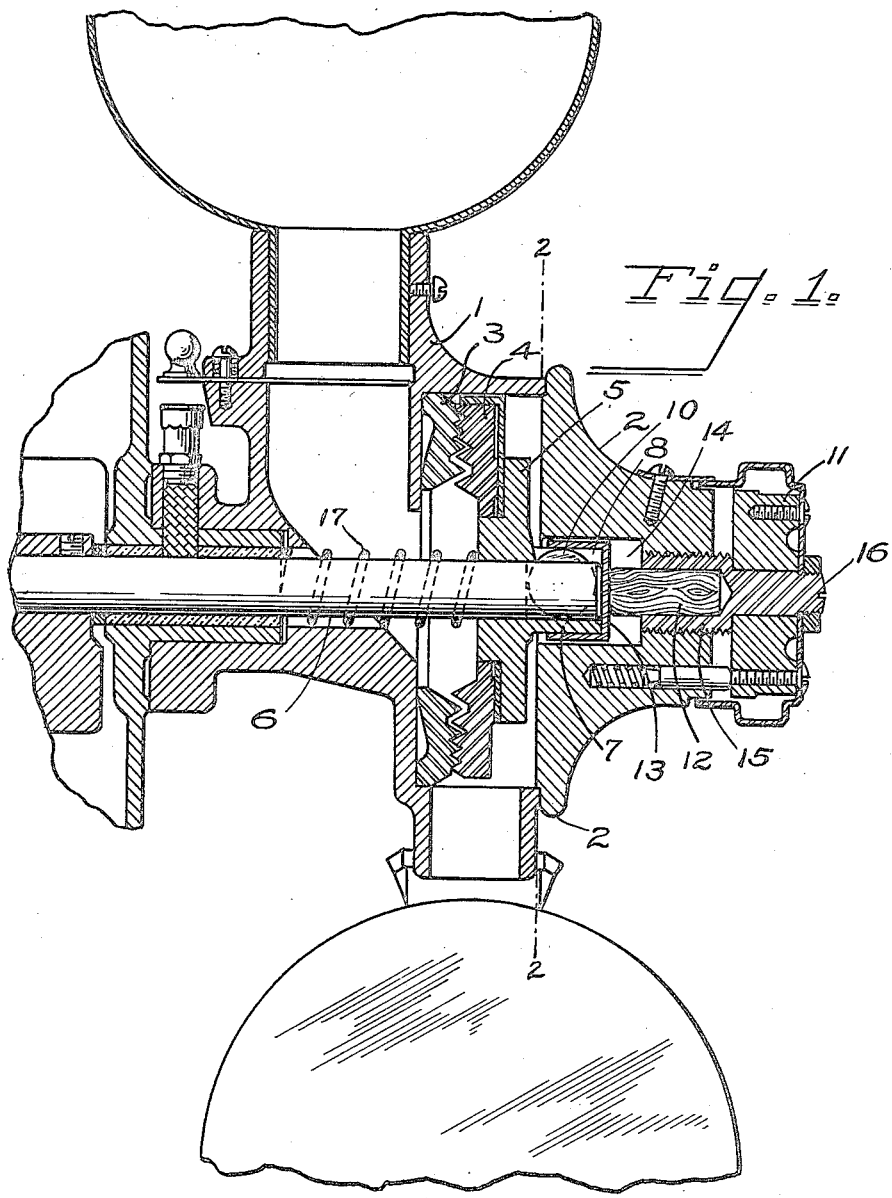

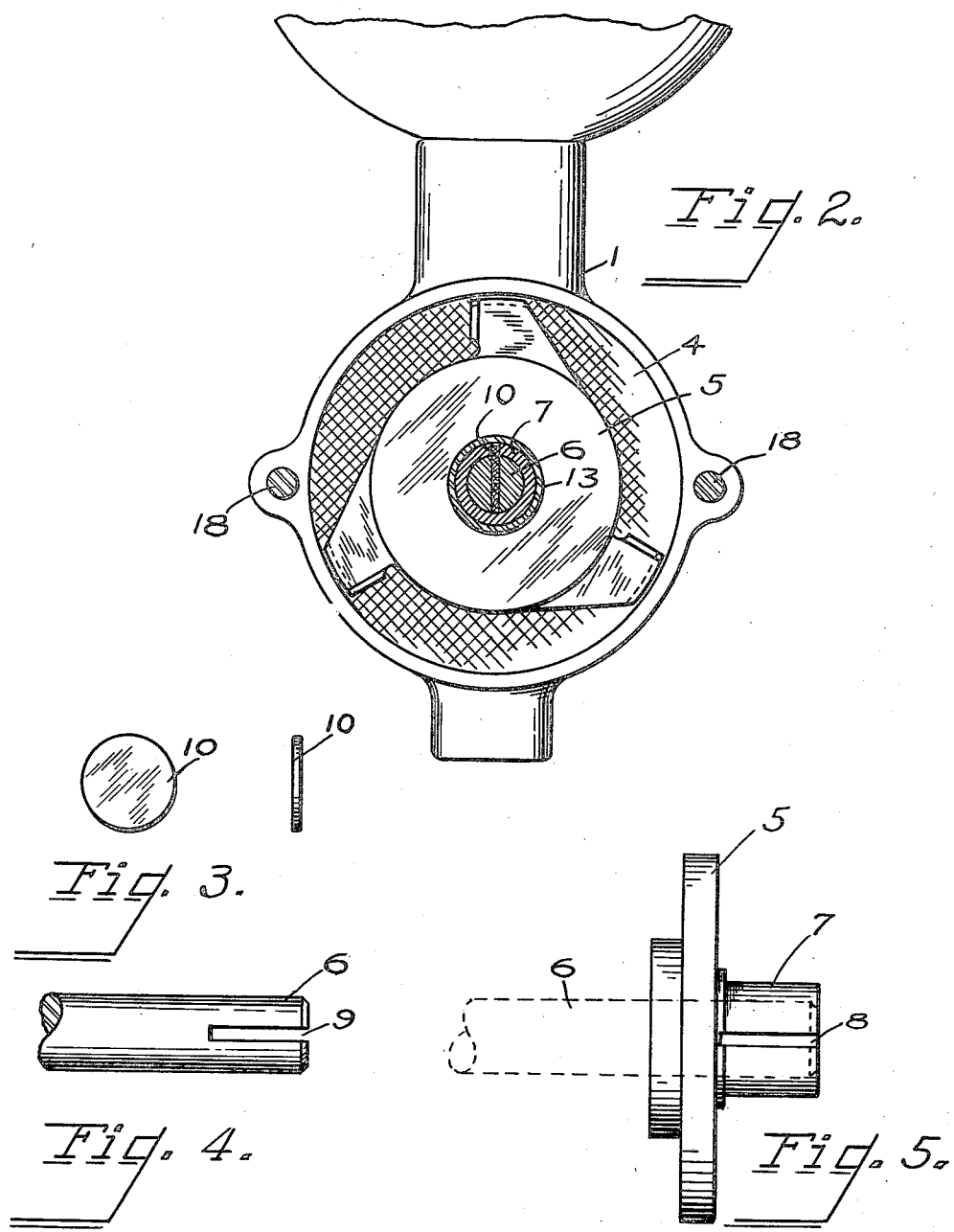

1,502,675

UNITED STATES PATENT OFFICE

HERBERT L. JOHNSTON, OF TROY, OHIO, ASSIGNOR TO THE HOBART MANUFACTURING COMPANY, OF TROY, OHIO, A CORPORATION OF OHIO.

GRINDER FOR COFFEE AND THE LIKE.

Application filed January 10, 1923. Serial No. 611,900.

*To all whom it may concern:*

Be it known that I, HERBERT L. JOHNSTON, a citizen of the United States, and a resident of Troy, in the county of Miami and State of Ohio, have invented certain new and useful Improvements in Grinders for Coffee and the like, of which the following is a full, clear, and exact description, reference being had to the accompanying drawings, forming part of this specification.

My invention relates to grinders of the usual type for grinding of coffee and the like, in which the material to be ground is fed from a hopper between a fixed and a rotatable burr, and in which provision is made for releasing the burrs with reference to each other in the event that any hard foreign material gains entrance to the burrs to prevent them from turning.

My invention in this connection belongs to that type in which shearing pins are employed to secure one or the other of the burrs in place, and in the event of a stoppage the holding pin will be sheared off to prevent breakage of the operating parts.

In such constructions it is frequently the job for a machinist to remove the broken pin and replace with a new pin, and it is the special object of my invention to provide such construction of part to be sheared and such construction and arrangement of the other mechanical parts that the user without any special mechanical skill can readily and easily replace the sheared part and restore the mechanism to its normal working condition.

In the drawings,

Figure 1 is a longitudinal central section of the burr grinding mechanism.

Figure 2 is a transverse section taken on the line 2—2 of Figure 1.

Figure 3 is a front and side elevation of the piece to be sheared off to release the rotating burr.

Figure 4 is a detail of the end of the driving shaft.

Figure 5 is a side elevation of the disk for rotating the movable burr.

The burr casing is indicated at 1, with the front case 2 attached thereto by bolts 18 so as to be easily removed.

Mounted within the casing 1 is the fixed burr 3, which is secured in place in any desired way. Engaging with this fixed burr is the rotating burr 4.

This burr is mounted on and secured to a disk plate 5 which is formed with a projecting hub portion 7.

This disk is mounted on the driving shaft 6 of the grinder. The end of the shaft 6 is formed with a slot 9 and the hub 7 of the disk 5 is formed with a corresponding slot 8, and the hub is keyed to the shaft 6 by a disk 10 of soft metal, preferably copper.

In order to hold the disk 10 in proper position I prefer to make use of a cap 13, which is fitted over the hub 7 in the recess 14 in the front casing 2. This cap which is a convenience in assembly and for holding the disk 10 is not essential and may be omitted.

I provide an oilless thrust bearing for the shaft 6 in the part 12, which has a bearing on the cap 13 when employed and is seated in the screwthreaded sleeve 15, which is threaded into the front casing 2 and is provided with a stem 16 on which is fitted a hand wheel 11. The burr 4 with its disk 5 is maintained in proper separated position from the fixed burr 3 by a coiled spring 17 bearing against the disk 5, and the adjustment for the proper distance apart of the burrs is obtained by rotation of the hand wheel 11.

In operation the rotatable burr is driven by the shaft 6. In the event that any hard foreign substance gets between the burrs 3 and 4, the revolving burr 4 will be stopped and with it the disk 5 with its hub, and as a result any excessive strain will shear off the key disk 10 and thus disconnect the driving shaft 6.

When this happens the unskilled user can readily remove the front burr case, pull off the cap 13, remove the sheared disk and replace it with a copper penny, if no other suitable disk is at hand, or by turning the disk on its edge he can bring a fresh portion of the disk into use. Thus anyone can re-assemble the parts for a cost, at the most, of one cent.

While the slots to hold the key disk have been designed of a size convenient for a copper penny, if any other disk is found to be more readily obtained in the localities in which the grinder is used, the key slots will be made of a size to correspond. The special feature in this connection is that a disk is employed as a key, which can be turned a number of times to present fresh portions as occasion may require, and that the slots are also designed to hold a size of disk which the user is apt to have on hand for replacement.

These grinding machines are used for the most part in retail groceries where pennies are always available.

Having thus described my invention, what I claim as new and desire to secure by Letters Patent, is:—

1. In a machine of the character specified, a rotatable member, a driving shaft projecting beyond the member with a slot in the projecting portion, and means for releasably securing the rotatable member to the driving shaft, comprising a key of comparatively soft metal of disk shape, seated in the shaft slot, and in connection with the rotatable member, whereby when sheared disk may be readily accessible and can be turned to furnish a new key.

2. In a machine of the character specified, a rotatable member, a driving shaft projecting beyond the member with a slot in the projecting portion, and means for releasably securing the rotatable member to the driving shaft, comprising a rotatable hub member to which the movable member is secured, the hub provided with a slot to co-operate with the slot in the shaft and a disk of comparatively soft metal seated in the shaft slot and extending into the hub slot, and serving as a key, whereby when sheared the disk may be readily accessible and can be turned to furnish a new key.

3. In a machine of the character specified, a rotatable member, a driving shaft projecting beyond the member with a slot in the projecting portion, and means for releasably securing the rotatable member to the driving shaft, comprising a rotatable hub member to which the movable member is secured, the hub provided with a slot to co-operate with the slot in the shaft and a disk of comparatively soft metal seated in the shaft slot and extending into the hub slot, and serving as a key, with a removable cap for holding the disk key in place, whereby a uniform strain may be exerted on the key and when sheared the disk may be readily accessible and can be turned to furnish a new key.

4. In a machine of the character specified, a rotatable member, a driving shaft projecting beyond the member with a slot in the projecting portion, and means for releasably securing the rotatable member to the driving shaft, comprising a key of comparatively soft metal of disk shape, seated in the shaft slot, and in connection with the rotatable member, whereby when sheared the disk may be turned to furnish a new key, and a front casing enclosing the disk connection removably attached to the main casing to permit ready access to the key disk connection.

5. In a machine of the character specified, a main casing and a front casing removably attached thereto, a fixed member and a rotatable member mounted in the main casing, a driving shaft projecting beyond the rotatable member, and terminating within the casing and having its end slotted diametrically, a correspondingly slotted hub member to which the rotatable member is secured, a thrust bearing for the shaft with a spring bearing upon the hub member to maintain the separation of the fixed rotatable member with means for adjusting the amount of separation of the members, and a disk of comparatively soft metal seated in the shaft slot and projecting into the slot in the hub for releasably connecting the driving shaft and rotatable member, said disk being of a size to be readily replaceable when sheared and adapted to be turned to furnish a fresh connecting portion if desired.

HERBERT L. JOHNSTON.